(12) United States Patent
Curtright et al.

(10) Patent No.: US 6,377,278 B1
(45) Date of Patent: Apr. 23, 2002

(54) METHOD AND APPARATUS FOR GENERATING DIGITAL MAP IMAGES OF A UNIFORM FORMAT

(75) Inventors: William Ames Curtright; Edwin E. Parks, both of Salem; Kevin J. Roethe, Gladstone; Matthew T. Bieker, Troutdale, all of OR (US)

(73) Assignee: Amesmaps, LLC, Salem, OR (US)

( * ) Notice: Subject to any disclaimer, the term of this patent is extended or adjusted under 35 U.S.C. 154(b) by 0 days.

(21) Appl. No.: 09/675,188

(22) Filed: Sep. 29, 2000

Related U.S. Application Data

(63) Continuation of application No. 09/080,128, filed on May 15, 1998, which is a continuation of application No. 08/767,319, filed on Dec. 16, 1996, now Pat. No. 5,844,570, which is a continuation of application No. 08/432,992, filed on May 2, 1995, now abandoned.

(51) Int. Cl.[7] .............................................. G06T 15/00
(52) U.S. Cl. ....................................................... 345/634
(58) Field of Search ................................ 345/629, 630, 345/631, 632, 634, 635

(56) References Cited

U.S. PATENT DOCUMENTS

| | | | |
|---|---|---|---|
| 4,571,684 A | * | 2/1986 | Takanabe et al. ........... 395/138 |
| 4,737,927 A | * | 4/1988 | Hanabusa et al. ........... 364/443 |
| 4,847,788 A | * | 7/1989 | Shimada ...................... 364/522 |
| 4,876,651 A | | 10/1989 | Dawson et al. .............. 364/449 |
| 5,283,562 A | | 2/1994 | Kaneko et al. .............. 364/131 |
| 5,341,463 A | | 8/1994 | Wescott et al. ............. 395/129 |
| 5,369,735 A | | 11/1994 | Thier et al. .................. 395/123 |
| 5,465,323 A | | 11/1995 | Mallet ......................... 395/123 |

OTHER PUBLICATIONS

Adobe Photoshop User Guide, Adobe Systems Incorporated, Chapters 9 & 10, pp. 79–90 (1993).*

* cited by examiner

*Primary Examiner*—Phu K. Nguyen
(74) *Attorney, Agent, or Firm*—Klarquist Sparkman, LLP

(57) ABSTRACT

A computer-implemented method and associated apparatus for generating digital map images of a uniform format. Bit-mapped map images corresponding to a printed map are obtained by scanning or other means. A bit-mapped map image is then cropped to select a map image corresponding to a desired geographic area, such as a one-degree by one-degree area. The boundaries of the selected map image are moved to shape the geographic area into a tessellated shape, such as a rectangle. The selected map image is then re-sized to contain a predetermined pixel area. The map image, now of a uniform format, is then stored with an identifier of a reference point and size of the geographic area represented by the map image. The identifier may be the name of a computer-readable file containing the map image.

11 Claims, 7 Drawing Sheets

FIG. 7A
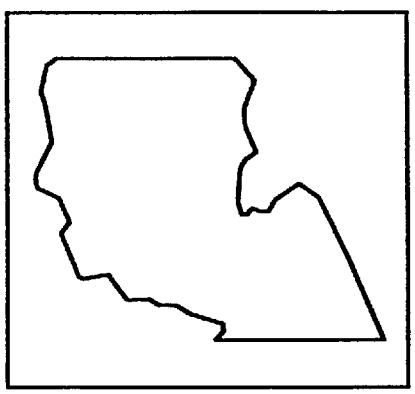
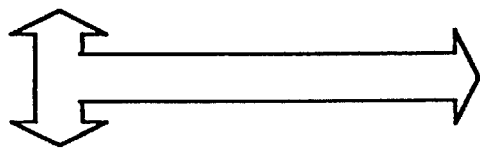
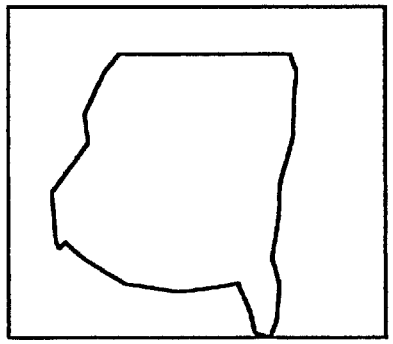
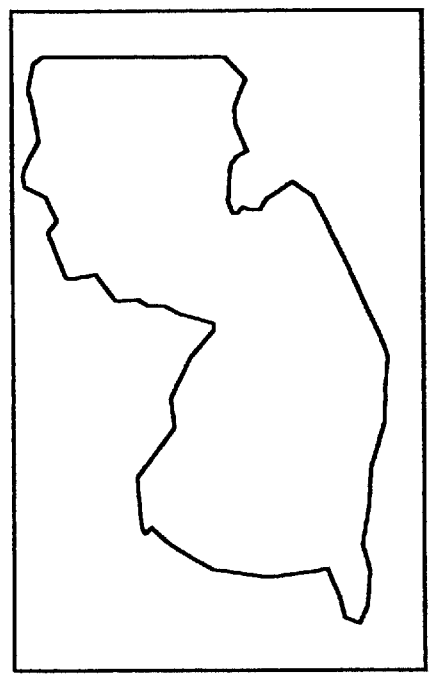
FIG. 7B
FIG. 7C

METHOD AND APPARATUS FOR GENERATING DIGITAL MAP IMAGES OF A UNIFORM FORMAT

RELATED APPLICATION DATA

This application is a continuation of application Ser. No. 09/080,128, filed May 15, 1998, which is a continuation of application Ser. No. 08/767,319, filed Dec. 16, 1996, now U.S. Pat. No. 5,844,570, issued Dec. 1, 1998, which is a continuation of application Ser. No. 08/432,992, filed May 2, 1995, now abandoned.

FIELD OF THE INVENTION

This invention relates generally to image processing. More particularly, this invention relates to a method for converting printed maps into digitally stored images of a unique format.

BACKGROUND OF THE INVENTION

Computer systems that can generate and display geographic map images are now commonly available. Typically a computer system that provides map images has stored within its memory system, such as in secondary storage, data corresponding to the map images. The map image data, if stored as bit maps, may be then be directly retrieved for display. Or the map image data may be stored as information within a database, and the computer system may independently generate a map image from the database information.

An increasingly popular use of computer-generated map images is for graphical navigation systems, such as "moving map" systems. Pioneer Electronics of Tokyo, Japan, for example has designed a moving map system for vehicles such as automobiles. A moving map system receives data from the Global Positioning System (GPS) satellites to determine the vehicle's current location. The moving map system uses this data to select geographic data stored in the system, such as on a CD-ROM, and retrieves therefrom a map image of the current location for display. The map image is actually a changing combination of several images that are generated as the vehicle moves from one geographic location to another, giving the appearance that the map is moving. A cursor on the map image shows the current vehicle location to the vehicle operator and allows him to navigate with the map image.

A drawback of present computer systems for displaying map images is the poor quality of the map images they display. In systems that generate map images from data within a database, the detail of the map image is sparse. Only those geographic objects that are recorded within a database field appear on the image. For example, a map database may contain fields for locating objects on the map, but not provide a field for displaying topological features such as elevations and valleys. On the other hand, systems that store detailed map images as bit maps do not store the images in a uniform format. Without a uniform format, the bit mapped images vary in size, making it difficult to accurately determine and display a vehicle's location on the map image. The varying size also leaves gaps on the screen as an image of one size is replaced by an image of another size. The various images are like poorly fitting pieces of a puzzle that cannot be pieced together without gaps between them.

An object of the invention, therefore, is to provide a method for providing highly detailed map images in a uniform format. This format should allow the computer system to display a cursor (i.e., a point of interest) on the map image to accurately show a vehicle's geographic location. This format should also allow the map images to seamlessly fit together so that no gaps appear on the display as one image is replace by another. When used in a moving map system, the map images should give the appearance of a unified image as the vehicle moves from one geographic area to another across individual map images. Another object of the invention is to provide an apparatus on which map images of a uniform format are stored for easy retrieval into a computer system.

These and other objects of the invention will become more apparent from the following detailed description of a preferred embodiment.

SUMMARY OF THE INVENTION

In accordance with the invention, a computer-implemented method of generating digital map images of a uniform format is shown and described. In the method, bit mapped map images corresponding to a printed map are provided. A bit mapped map image is then cropped to select a map image corresponding to a desired geographic area, such as a one degree by one degree square. The boundaries of the selected map image are selectively moved to shape the geographic area into a tessellated shape, such as a rectangle. The selected map image is then re-sized to contain a predetermined pixel area. The map image, now of a uniform format, is then stored with an identifier of a reference point, such as a location, and size of the geographic area represented by the map image. For example, the identifier may be the name of a computer-readable file containing the map image.

The initial bit mapped map image may be obtained from a printed map through scanning or other known techniques for converting printed graphics into electronic images. The desired geographic area may be defined on the map with reference grid lines such as latitude and longitude lines.

An apparatus according to the invention may comprise a storage medium such as a CD-ROM on which are stored a plurality of bit mapped geographic map images in computer readable form. Each image has a predetermined pixel area and an identifier of a reference point and size of the geographic area represented by the map image. The identifier is preferably the name of the image file.

CD-ROMs and other devices imprinted in accordance with the method of the invention provide a unique store of map images which may be used in any number of way. The map images are particularly valuable in moving map systems where it is desirable to view detailed graphic information on a display as a car, plane or other vehicle moves from one geographic location to another. Another valuable use is for constructing and printing custom maps. For example, a number of map images may be retrieved from the CD-ROM and combined into a larger map that covers a planned trip route. The layer map image is then printed.

These advantages and other advantages and features of the inventions will become apparent from the following description of a preferred embodiment, which proceeds with reference to the following drawings.

BRIEF DESCRIPTION OF THE DRAWINGS

FIG. 2 including

FIG. 7 including FIGS. 7A–7C is a pictorial diagram showing how a map image is derived from two printed maps according to the invention.

DETAILED DESCRIPTION OF A PREFERRED EMBODIMENT

Figure 1:
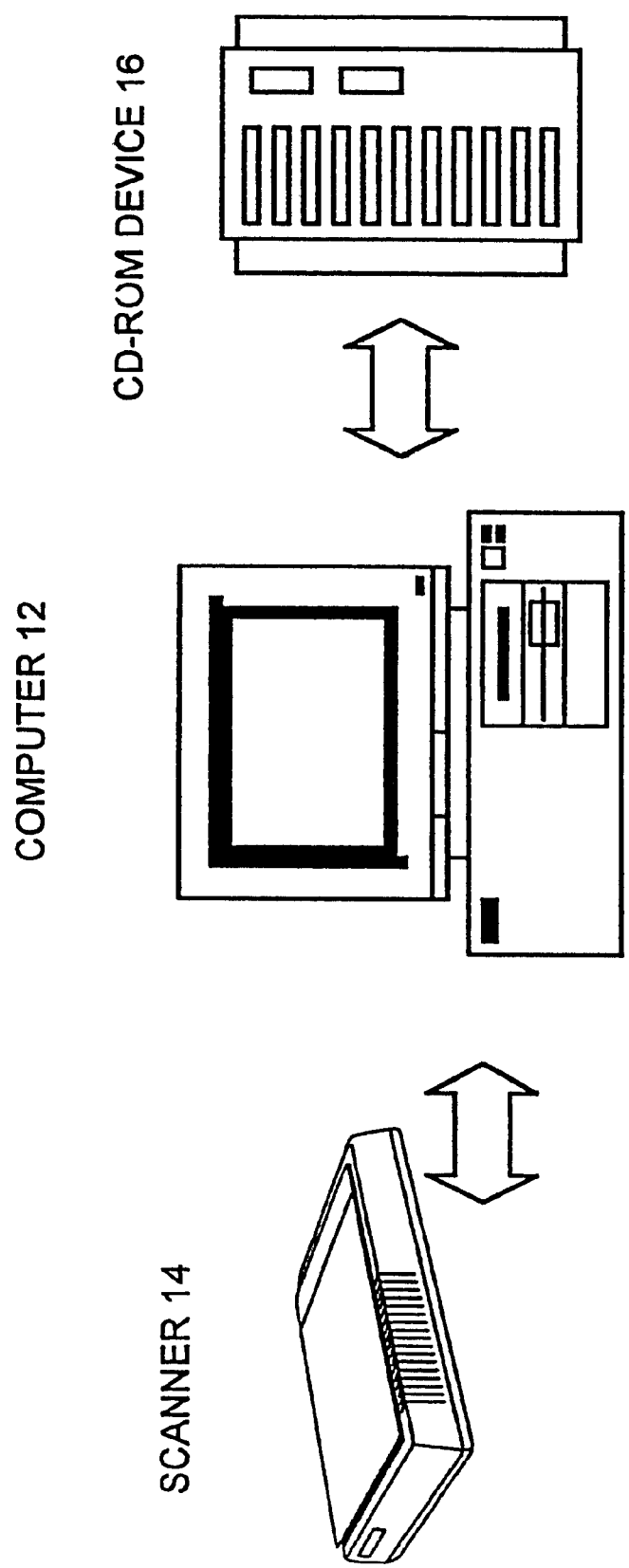
FIG. 1 is a pictorial diagram showing a computer system for converting printed maps into bit mapped map images according to the invention.

FIG. 1 shows a computer 12, scanner 14 and a CD recordable device 16 for imprinting data on a CD-ROM. As explained in detail below, printed maps are scanned by scanner 14, which converts them to digital electronic map images. By printed map is meant a map physically drawn on paper or other medium in a form recognizable by a human being, as opposed to a map image on a computer display screen or residing in computer memory. These map images are then edited, using software running on computer 14, into a unique uniform format. Using device 16, the edited images are then stored on a CD-ROM (Read Only Memory) with a directory, allowing the images to be easily retrieved when the CD-ROM is read in a CD-ROM drive.

The devices described above are of conventional design. Scanner 14 may be any type of scanning device capable of converting a printed map into an electronic image that may be stored in a computer-readable file on a medium such as a disk or tape. In the preferred embodiment, a drum scanner is used because of its large scanning surface. Computer 12 may be a personal computer, workstation or any other device capable of editing graphical images contained in an electronic file. In the preferred embodiment, computer 12 is a personal computer containing a hard disk and a tape drive. The computer is equipped to run image editing software such as the Adobe Photoshop™ computer program available from Adobe System Incorporated of Mountain View, Calif., which is hereby incorporated by reference. Device 16 is a CD recordable device capable of writing data onto CD-ROMs. A preferred form of the device is JVC model XR-W2001 CD-recordable drive with appropriate software (Personal Archiver or ROM Maker) for writing once to recordable compact discs. In the preferred embodiment, device 16 is also equipped with a hard disk drive for reading map images and imprinting the image data onto a CD-ROM. The preferred embodiment uses tapes for moving the map images from scanner 14 to computer 12 and a network for moving the images from computer 12 to CD-ROM device 16 It should be understood that the data may also be moved between these devices in other ways. For example, the map image data may be moved by transfer over wire, by disk, or by any other known way to transport data between devices.

FIGS. 2A–D broadly illustrate the steps of a method according to the invention for converting printed maps into digital map images of a uniform format. The major steps are described in the flow chart of FIG. 3, with the more detailed steps that comprise the major steps described in FIGS. 4–6.

Figure 3:
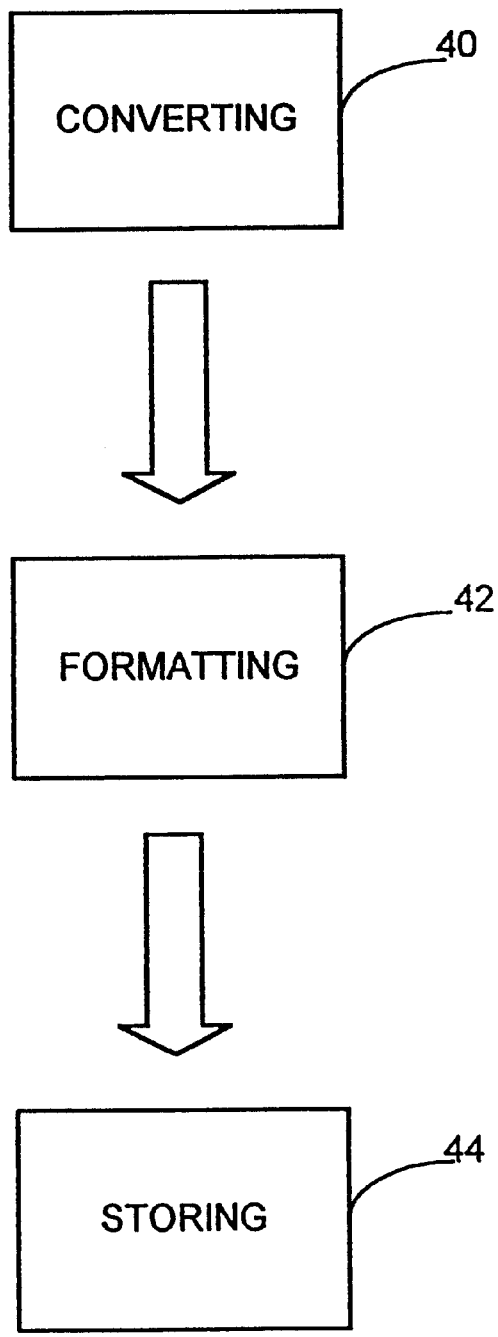
FIG. 3 is a flow chart of the major steps of the method according to the invention.

Referring now to FIG. 3, the first step in the method is converting a printed map into a bit mapped map image that can be edited with a computer or equivalent device (40). As known in the art, a bit mapped image is a raster image in which each pixel is represented by one or more bits, such as eight bits per pixel. Using the computer, the map images are then edited into a uniform format (42). Finally, the edited map images are stored in a manner such as on a CD-ROM that allows them to be quickly retrieved by a computer or equivalent device (44).

Figure 2A:
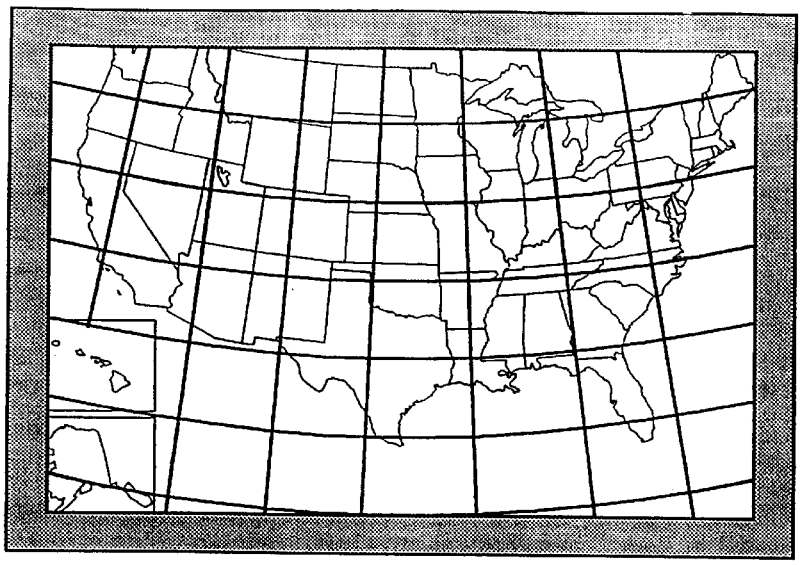
FIGS. 2A–2D is a pictorial diagram showing how a printed map is physically cut, partitioned, and edited using a method according to the invention.
Figure 2B:
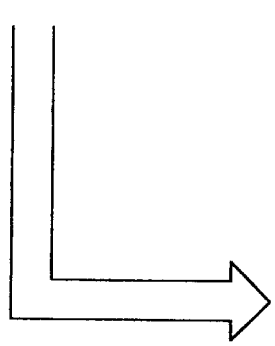
Figure 4:
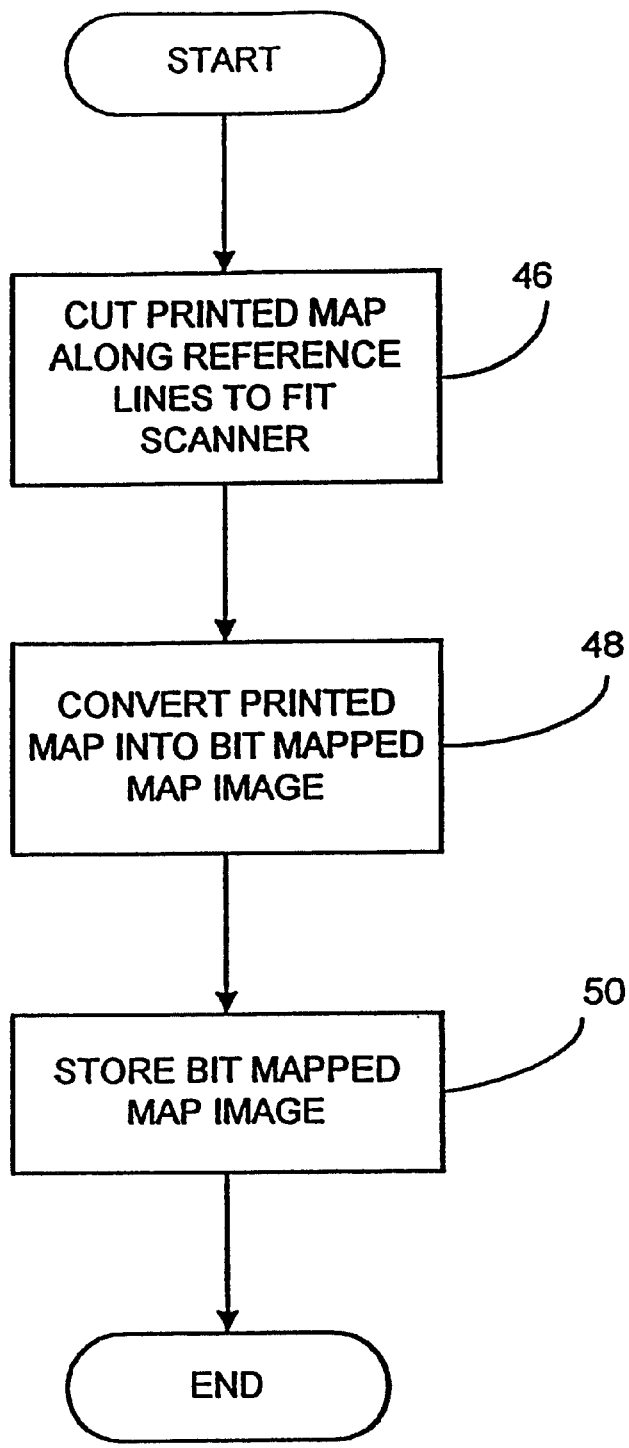
FIG. 4 is a flow chart of the converting step of FIG. 3.

FIG. 4 shows the details of the converting step 40. Printed maps of a significant size must first be cut or otherwise divided into sections that fit on scanner 14 (46). As an example, FIG. 2A shows a printed map of the United States. To fit the scanner, the printed map is generally cut along its reference lines, such as the latitude and longitude lines that appear on many maps. FIG. 2B shows a cut section with latitude lines 47 and longitude lines 49. Other reference lines might include the lettered and numbered lines that often appear on city maps. Preferably the cut sections are as large as possible to minimize the effort required to cut and then scan the entire map.

The cut map sections are then scanned to convert them into digital images (48). Any scanner capable of scanning graphical images will likely work. However, in the preferred embodiment a drum scanner is used because it can scan larger map sections. Alternatively, other devices that are capable of converting printed maps into digital images may be used, such as a digital video cameras that capture images for storage in digital form.

The digital map images are then stored on tapes with a general identifier of their contents, such as the name of the map and map areas (50).

Figure 2C:
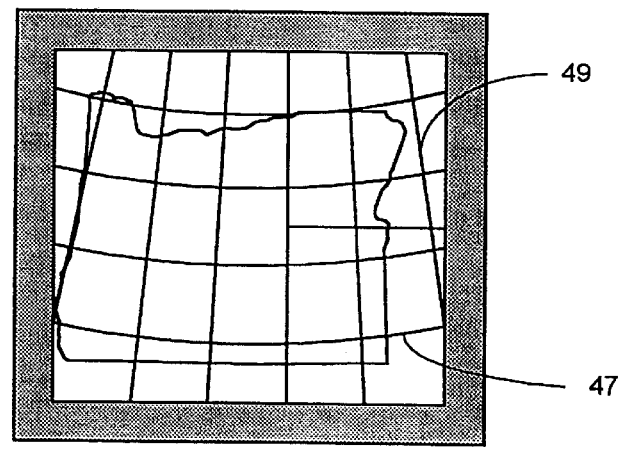
Figure 2D:
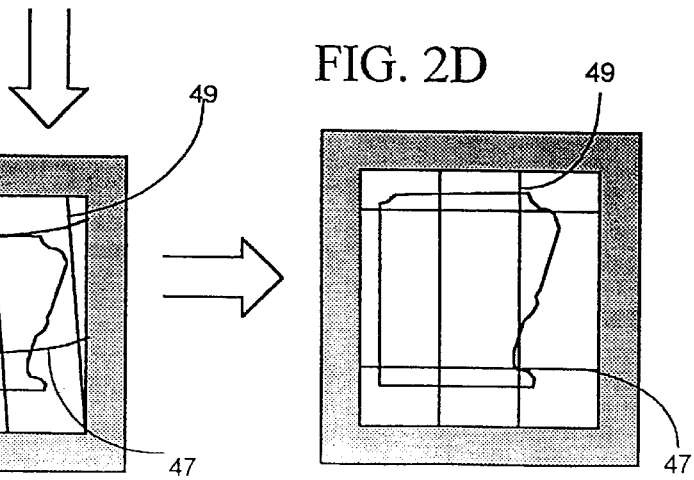
Figure 5:
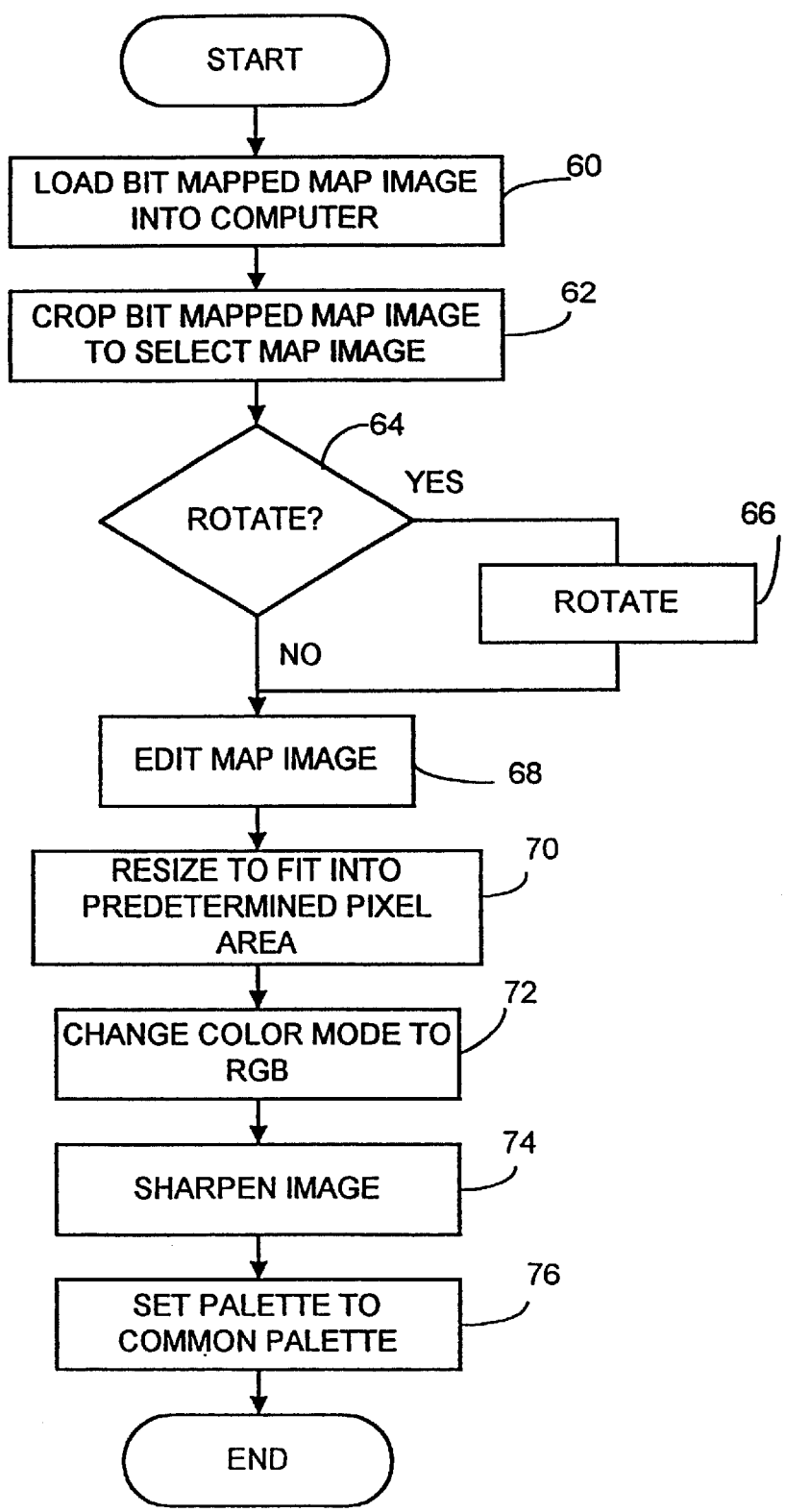
FIG. 5 is a flow chart of the formatting step of FIG. 3.

FIG. 5 shows the detailed steps that comprise editing a digital map image into an image of a uniform format. A bit mapped map image file, either from the scanner or another source, is loaded into computer 12 for editing with image editing software (60). FIG. 2B shows an example of such a map image. Using the image editing software, the bit mapped map image is cropped to select a map image corresponding to a desired geographic area, such as a one degree longitude by one degree latitude area (62). This area is preferably the area that all map images of a selected map type are cropped to. FIG. 2C illustrates a cropped image.

Note in the cropped map image that the area between the reference grid lines (the longitude and latitude lines in the map of FIGS. 2A–D) is not rectangular because the latitude lines 47 curve upward and the longitude lines 49 taper inward. This rounded shape presents two problems. First, the actual size of one degree by one degree map images varies. Images with coordinates closer to the equator are larger than images closer to the poles. This makes locating a point on a map image difficult because the pixel relationship between image and map locations differ for each map. For example, if one map image is 600 pixels across and another is 400 pixels across, then relative to reference line, the 200th pixel represents a different map location in each map image. Second, the shape of the map images are not regular shapes that fit together to provide a seamless appearance such as rectangles, triangles, etc. These type of regular shapes are often called tessellated shapes. Irregular shapes cannot be seamlessly pieced together electronically once they have been divided and stored as bit maps. To overcome these difficulties, the images are edited using image editing software. Before beginning the editing process, however, the image may need to be rotated for the proper orientation (64, 66). This may be necessary because of the mis-orientation of the bit mapped map image when it was originally scanned.

Once the image is properly oriented, it is edited into a uniform format using the image editing software (68). For example, in the Adobe Photoshop™ program, the image may be manipulated with the skewing and distorting functions, among others. However, depending on the size of the cropped image, it may be first partitioned into quadrants that are more easily edited. Again, this partitioning may be done with the cropping tool.

To square the image along the latitude and longitude lines (or other reference grid lines) of the desired geographical area, the bit mapped map image is cropped to encompass these lines. The corners of the cropped image boundaries now have "handles" which can be selectively moved to square the geographic area into a rectangular shape using the editing tools. To straighten a curved latitude line 47, for example, a handle on one end of the line is selected and moved until the line is straight. Similarly, one end of a longitude 49 line can be moved so that the line is perpendicular to a straightened latitude line 47. If necessary, the selected map image, which now contains the rectangularized geographic area, is further cropped to match the image area to the geographic area. This cropping step may be needed if the first cropping encompasses more than the geographical area. This manipulation is then performed on adjacent image quadrants, and the images re-combined into an image of a desired uniform format.

The selected map image is then re-sized to contain a predetermined pixel area (70). The Image Size command may be used to accomplish this step. The preferred pixel area is a rectangle of 720 pixels in width and 900 pixels in height.

If the color mode of the edited image is CMYK, the mode is then changed from CMYK to RGB so that the map images may be displayed on a computer display (72). CMYK (cyan, magenta, yellow and black) are subtractive colors used for printing color images. As these color inks are added together on a page, they absorb more and more of the light spectrum, with a combination of the four colors providing a black color. RGB (red, green blue), on the other hand, are additive colors. Additive colors combine to produce white light. Additive colors are used for lighting, video, film recorders and display monitors. Because these map images are likely to be viewed primarily on display screens, it is desirable to change their color mode from CMYK to RGB. This change is necessary, of course, only if the map image is not in the RGB mode to begin with.

Often a map image is not sufficiently focused and must be sharpened to increase its clarity. If necessary, this may be done with a sharpen tool in the image edit software, which increases the contrast between pixels of the image (74).

The last step of the formatting process is converting similar colors of all selected map images to colors of a color palette common to all images (76). By using the same color palette, all maps have the same colors for the same types of features. "Movement" across several map images thus appears to be seamless. In the present embodiment, the common color palette is a default palette.

Figure 6:
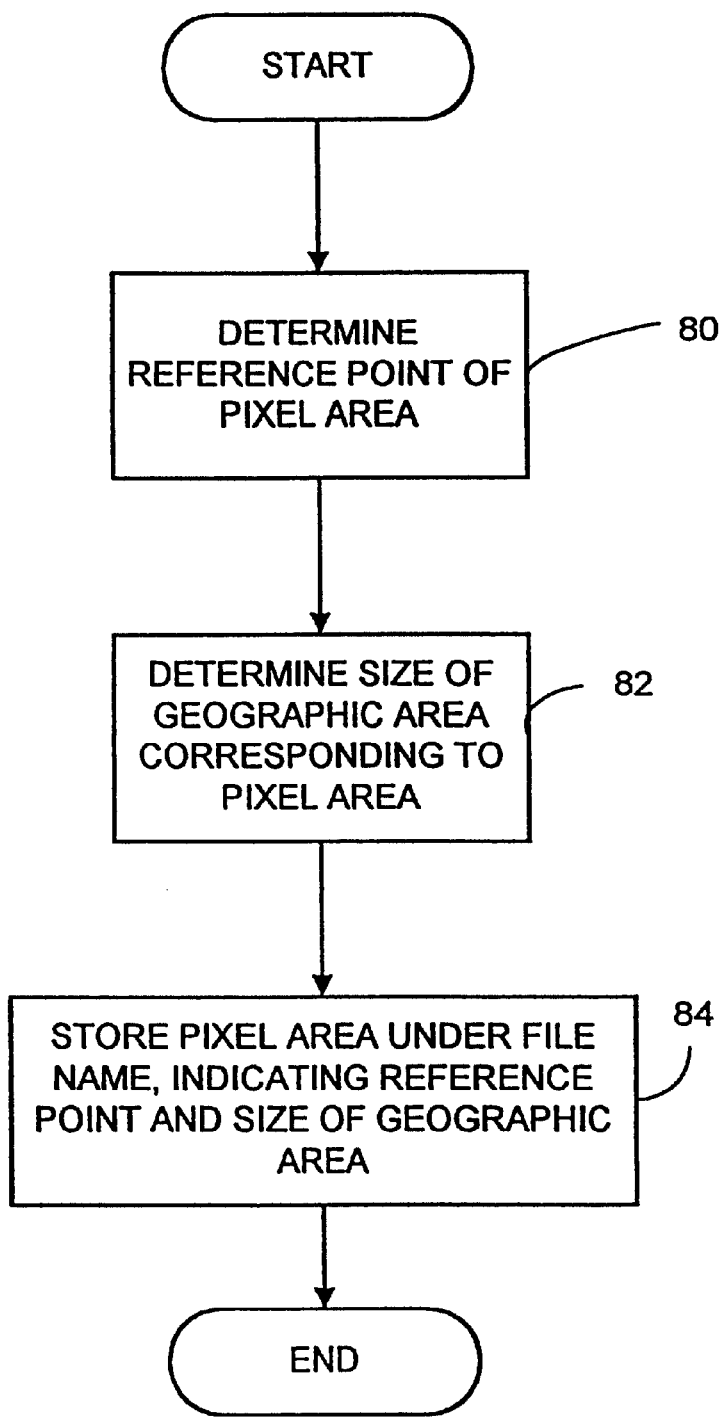
FIG. 6 is a flow chart of the storing step of FIG. 3.

Once the image editing is complete, the image is stored for later reference. FIG. 6 shows the steps involved in storing the images. A reference point of the pixel area, such as the intersection of the longitude and latitude of the western and northern map boundaries, is determined (80). This reference point may be an indicator of a geographic location. The geographical area of the map image is also determined, such as one degree by one degree (82). The map image is then stored with an identifier of the reference point and size of the geographical area (84). In the preferred embodiment, the identifier is a name of a computer-readable file containing the image such as W121_46. The W indicates the size of the geographic area and the numerals are the reference point. The identifier, of course, may be any character string that ultimately can be used to identify the map's geographic area, such as an index to a look up table. Other naming conventions, of course, may be used so long as they reflect a reference point for the image and the geographical area represented by the image. Locations within a map image can be accurately determined from this information since all map images have the same pixel area. It then is a simple process to translate a geographical location into pixel coordinates.

This process is repeated to convert one or more printed maps into a plurality of digital map images. In the preferred embodiment, the edited map images are stored along with a file directory to network storage. From there the images are transferred to a hard disk drive associated with CD-ROM device 16. The device 16 reads the images and file directory from the drive and writes them onto a compact disc. The result is a disc containing a number of map images of a uniform format, all stored such that they can be individually and accurately retrieved for display or printing.

In some circumstance, additional editing is required if a desired map image appears partly on separate printed maps. For example, a one degree square section may overlap opposite sides of a map, such as illustrated in FIG. 7. Each of these partial sections initially is scanned in as bit mapped map images. Portions of the desired map image are then separately cropped from the bit mapped map images. The two cropped portions are then merged into a single map image, which is edited in the manner described above.

Having illustrated and described the principles of the invention in a preferred embodiment, it should be apparent to those skilled in the art that the embodiment can be modified in arrangement and detail without departing from such principles. For example, reference points other than latitude and longitude locations may be used. In some circumstances, the bit mapped map images may already be available without scanning, in which case the method of the invention begins with providing the bit mapped map images.

In view of the many possible embodiments to which the principles of our invention may be applied, it should be recognized that the illustrated embodiment is only a preferred example of the invention and should not be taken as a limitation on the scope of the invention. Rather, the invention is defined by the following claims. We therefore claim as our invention all such embodiments that come within the scope and spirit of these claims.

We claim:

1. A computer implemented method of preparing bit-mapped map images of a desired surface area, the method comprising:

providing first and second bit-mapped map images;

cropping a portion of the first bit-mapped map image to achieve a boundary having a straight line portion adapted to being fitted adjacent the second bit-mapped map image;

cropping a portion of the second bit-mapped map image to achieve a boundary having a corresponding straight line portion adapted to match the straight line portion of the boundary of the first bit-mapped map image, wherein a desired feature of the second bit-mapped map image is aligned so as to merge with the corresponding feature of the first bit-mapped map image without visual discontinuity; and storing the cropped first and second bit-mapped map images for subsequent retrieval for display as a plurality of bit-mapped map images adapted to being fitted seamlessly together.

2. The method of claim 1, wherein the method comprises preparing at least three bit-mapped map images and each of the bit-mapped map images is cropped to achieve a boundary having a straight line portion adapted to match a straight line portion of at least one of the other bit-mapped map images.

3. The method of claim 2, further comprising cropping the entire boundary of each of the bit-mapped map images to achieve a tesselated shape for each of the bit-mapped map images.

4. The method of claim 3, further comprising sizing each of the tesselated shapes to contain a predetermined pixel area.

5. The method of claim 1, comprising sizing at least one of the first and second bit-mapped map images to contain a predetermined pixel area.

6. The method of claim 5, wherein each of the first and second bit-mapped map images contains a predetermined pixel area.

7. The method of claim 6, wherein each of the first and second bit-mapped map images contains a uniform predetermined pixel area.

8. The method of claim 1, wherein each of the first and second bit-mapped map images is stored with an identifier comprising a reference point.

9. A method of displaying bit-mapped map images of a desired area, the method comprising:

retrieving from a computer readable form first and second cropped bit-mapped map images, each of the bit-mapped map images having been prepared so that a straight line portion of the boundary of the first cropped bit-mapped map image is adapted to match a corresponding straight line portion of the second cropped bit-mapped map image wherein a desired feature of the second bit-mapped map image is aligned so as to merge with the corresponding feature of the first bit-mapped map image without visual discontinuity; and placing the first and second cropped bit-mapped map images on a medium of visual display so that the corresponding straight line portions of the respective bit-map mapped images are adjacent to one another, forming a seamless plurality of images.

10. Apparatus for providing a plurality of digital map images, comprising:

a storage medium for use in a computer system for storing bit-mapped map images in computer-readable form; and first and second bit-mapped map images stored in computer readable files on the medium, the first bit-mapped map image having a boundary comprising a straight line portion adapted to being fitted adjacent the second bit-mapped map image, the second bit-mapped map image having a boundary comprising a corresponding straight line portion adapted to match the straight line portion of the first bit-mapped map image wherein a desired feature of the second bit-mapped map image is aligned so as to merge with the corresponding feature of the first bit-mapped map image without visual discontinuity.

11. Apparatus as in claim 10, wherein the first and second bit-mapped map images are cropped to provide the corresponding straight line portions of the respective boundaries.

* * * * *